Feb. 13, 1934. G. JAEGER Re. 19,085

TRUCK CONCRETE MIXER

Original Filed March 24, 1928

Inventor
GEBHARD JAEGER
By
his Attorneys

Reissued Feb. 13, 1934

Re. 19,085

UNITED STATES PATENT OFFICE 19,085

TRUCK CONCRETE MIXER

Gebhard Jaeger, Columbus, Ohio, assignor to The Jaeger Machine Company, Columbus, Ohio, a corporation of Ohio Original No. 1,801,162, dated April 14, 1931, Serial No. 264,347, March 24, 1928. Application for reissue November 1, 1932. Serial No. 640,729

8 Claims. (Cl. 83—73)

This invention relates to concrete mixers and particularly to that type in which the mixing drum is mounted on a truck having an engine propelling mechanism adapted to be utilized as the means for operating the mixing drum.

The object of the invention is to provide improved and simplified means whereby the mixing drum can be driven in one direction by the engine to effect principally the mixing of the concrete materials and in the opposite direction by the same means to effect principally the discharge of the mixed materials and dispense with mechanism for raising and lowering the drum in effecting the mixing and discharge of the concrete materials. Other objects of the invention can be gathered from the disclosure herein.

The invention is embodied in the example herein shown and described the features of novelty being finally claimed.

In the accompanying drawing—

Figures 1, 2, 3:
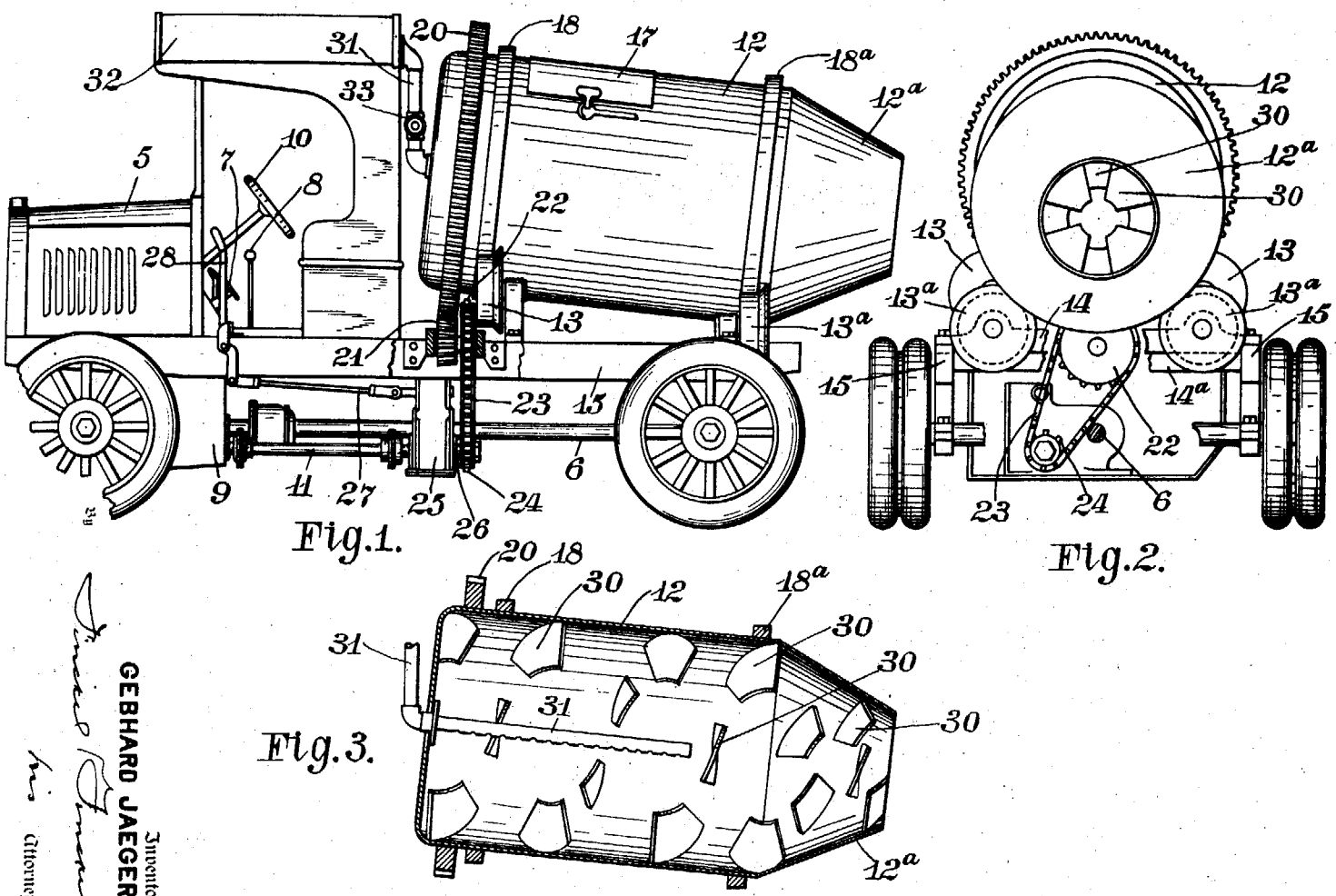
Figure 1 is a view in side elevation of the invention, parts being broken out to illustrate details.
Fig. 2 is a rear view of the same, also with parts broken out.
Fig. 3 is a central longitudinal view of the mixing drum removed from the truck.

In the views 5 designates the truck, it consisting of an ordinary gasoline motor vehicle and containing an engine, the propeller shaft 6 extending to a differential gear at the rear for driving the wheels, a clutch operated by a foot lever 7, a gear shift lever 8 for controlling the usual change speed and reversing gear in box 9.

In addition to these parts there is in the present instance extended from the gear box a power take off shaft 11 adapted to be operated from the crank shaft of the engine and gears in the rear box 9 to turn said take off shaft clockwise or anti-clockwise as desired.

A power take-off is common in some forms of motor trucks, as for example, such as used for raising and lowering one end of a dumping body. In the present instance the take-off shaft extends to a box or housing 25 from which protrudes a normally idle short shaft 26 having fixed thereon the sprocket wheel 24. In said housing 25 is a suitable clutch mechanism operable through a link 27 and handle 28 to connect and disconnect at will the short shaft 26 with the power take-off shaft 11. By this means the short shaft 26 and sprocket wheel 24 thereon can be driven either clockwise or anti-clockwise as desired.

12 designates the mixing drum which is supported in rear of the driver's seat to roll on forward pair of rollers 13 and rear pair of rollers 13ª, these rollers being journaled in stout saddles 14 and 14ª, respectively, secured transversely on the truck sills 15. In the example shown the drum is mounted on its supporting rollers 13 and 13ª so that its axis of rotation is inclined to the horizontal from its forward end to the rear, the forward rollers for the purpose being journaled in a plane above that of the journaling of the rear rollers. The main body of the drum is cylindrical in form terminating at its rear in tapered portion 12ª, the lower side of which is inclined upwardly from the horizontal. The rear end of the drum is shown as left open for the discharge of the mixed material, no closure being required at this end as will hereinafter appear.

The drum is preferably supplied with the dry materials to be mixed through an opening covered with an ordinary hinged lid 17 adapted to be tightly latched when the drum is rotated to mix and discharge the materials. The drum is provided with projecting circumferential track bands 18 and 18ª to rest and travel on said rollers 13 and 13ª respectively; and because the rollers are flanged the drum is securely positioned thereon.

The forward end of the drum is provided with a peripheral gear rack 20 engaged by a pinion 21 journaled in suitable bearings between the truck sills, the shaft of said gear 21 having secured thereto a sprocket wheel 22 driven by a sprocket chain 23 that is in turn driven by a small sprocket wheel 24 driven through a clutch by the power take-off of shaft 11.

The interior of the drum including its rear tapered end is provided with a series of mixing blades 30 arranged in suitable fashion, preferably spiral and staggered so as to tend to cause a motion of the concrete materials in an upward direction within the drum toward the forward end thereof, but as it is piled up at the forward end the material is caused to slide by gravity rearward where it is again picked up by the more rearward blades, hence the two forces acting on the materials cause them to have, in effect, a back and forth motion in the drum in addition to the rotary motion thereby promoting their thorough mixing. The gearing of the drum is preferably, but not necessarily, such that this operation can be coincided with the forward motion of the vehicle in which case the operation of the sprocket chain 23 is reversed to discharge the mixed materials from the drum.

The necessary water can be supplied to the interior of the drum by means of a pipe 31 extending to or into the drum from a suitable tank 32 located in any suitable position as for example above the driver's cab. Said pipe 31 is provided with a valve operated by a wheel 33 to establish or cut off the flow of water.

In practice it is designed that the mixing drum shall be supplied with the materials to be mixed at a central plant or station and the mixing operation performed during the time or portion of the time used in driving the machine to the job. To effect a most thorough mix the usual dry materials can be mixed first and the water added subsequently.

The blades are made sufficiently numerous in the tapered end of the drum to prevent the material from flowing out when the mixing drum is rotated in mixing direction; and all the blades cooperate to effect a rapid and thorough discharge of the mixed materials when turned in the reverse direction.

The machine will be useful in emergencies as where the materials are at the place of the job and the ordinary machine used by the contractor is temporarily out of order.

The forms, proportions and arrangement of the parts can be changed without departing from the gist of the invention as claimed.

What I claim is:

1. A mixing drum for concrete materials and the like consisting of a substantially cylindrical portion having a frusto-conical discharging portion at one end, spirally arranged blades in said cylindrical portion, and blades in said frusto-conical portion, said drums adapted for rotation in opposite directions, the blades in said cylindrical portion adapted to mix the materials when the drum is rotated in one direction and the blades in the frusto-conical portion adapted to discharge the mixed materials from the drum when the drum is rotated in the opposite direction.

2. In a transit concrete mixer and agitator, a cylindrical receptacle having a frusto-conical discharge end and its other end closed, said cylindrical receptacle mounted to turn on an axis inclined to the horizontal and means within said receptacle for moving concrete material within the receptacle from the discharge end toward the closed end from whence it may be returned by gravitational action toward the discharge end, to effect agitation or mixing of said material.

3. In a transit concrete mixer and agitator, a cylindrical receptacle having a frusto-conical discharge end and its other end closed, said cylindrical receptacle mounted to turn on an axis inclined to the horizontal, spirally arranged means within said receptacle for moving concrete material within the receptacle from the discharge end toward the closed end from whence it may be returned by gravitational action toward the discharge end, to effect agitation or mixing of said material.

4. In a transit concrete mixer and agitator, a cylindrical receptacle having a frusto-conical discharge end and its other end closed, said cylindrical receptacle mounted to turn on an axis inclined to the horizontal and means within said receptacle for moving concrete material within the receptacle from the discharge end toward the closed end from whence it may be returned by gravitational action toward the discharge end, to effect agitation or mixing of said material, and means whereby said receptacle may be rotated in either direction at will.

5. In a transit concrete mixer and agitator, a receptacle having a discharge opening and a surface inclined downwardly toward said opening; and means for moving concrete material away from said opening and toward the upper portion of said surface from whence it may be returned by gravitational action toward said opening, to effect agitation or mixing of said material.

6. In a transit concrete mixer and agitator, a rotatable drum having a discharge opening at one end, the peripheral walls of said drum providing a surface inclining downward toward said opening; and means for moving concrete material away from said opening and toward the upper portion of said surface from whence it may be returned by gravitational action toward said opening, to effect agitation or mixing of said material.

7. In a transit concrete mixer and agitator, a receptacle having a discharge opening and a surface inclining downwardly toward said opening; means adapted through movement in one direction to move concrete material away from said opening and toward the upper portion of said surface, from whence it may be returned by gravitational action toward said opening, to effect agitation or mixing of said material, said means also adapted upon movement in another direction to assist in moving material from said upper portion toward said opening and means whereby said drum may be rotated in either direction at will.

8. In a transit concrete mixer and agitator, a rotatable drum having a discharge opening at one end, and a surface inclining downwardly toward said opening; spirally arranged blades within said drum adapted when said drum is rotated in a predetermined direction to simultaneously produce a mixing or agitation of concrete materials within said drum, and a constant end to end movement of said materials away from said opening to the upper portion of said surface, said materials returning toward the lower portion of said surface through gravitational action, said blades also serving upon reverse rotation of said drum to assist in movement of said materials downwardly upon said surface toward said opening and means whereby said drum may be rotated in either direction at will.

GEBHARD JAEGER.